INVENTORS
FRANCIS C. KOOPMAN
J. L. KUNKLER
BY Ernest Cohen
M. Howard Silverstein
ATTORNEYS

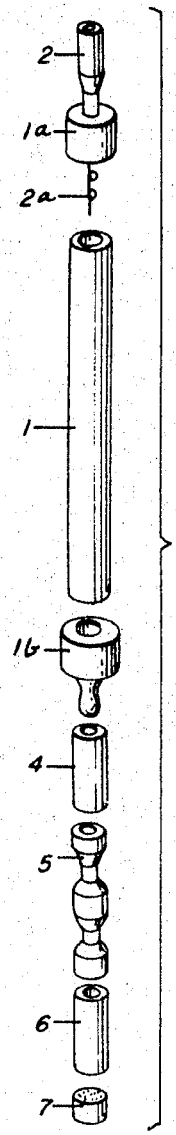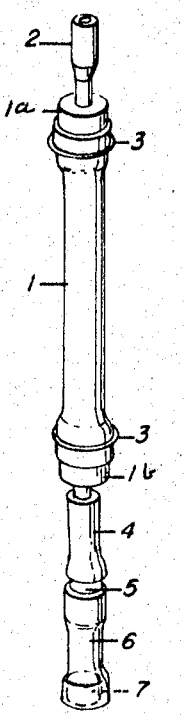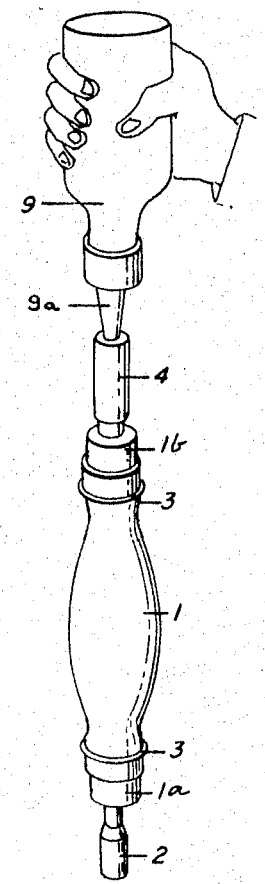
FIG. 1
FIG. 2
FIG. 3
INVENTORS
FRANCIS C. KOOPMAN
J. L. KUNKLER
ATTORNEYS Aug. 26, 1969     F. C. KOOPMAN ET AL     3,463,717
REFERENCE AND GLASS ELECTRODES CAPABLE OF
WITHSTANDING HIGH PRESSURES
Filed Jan. 7, 1966     2 Sheets-Sheet 2

United States Patent Office 3,463,717
Patented Aug. 26, 1969

3,463,717
REFERENCE AND GLASS ELECTRODES CAPABLE OF WITHSTANDING HIGH PRESSURES
Francis C. Koopman and J. L. Kunkler, Albuquerque, N. Mex., assignors to the United States of America as represented by the Secretary of the Interior
Filed Jan. 7, 1966, Ser. No. 519,396
Int. Cl. B01k 3/04
U.S. Cl. 204—195                                    6 Claims

ABSTRACT OF THE DISCLOSURE

A reference electrode is provided with flexible, distensible electrolyte reservoir walls to maintain the pressure within the electrode electrolyte at a greater pressure than the surrounding working environment. A glass electrode is provided with flexible walls to equalize the pressure across the electrode's fragile glass membrane.

---

This invention relates to improvements in reference and glass electrodes.

A reference electrode consists of an inner electrode composed of a metallic conductor, usually in the form of a wire, immersed in an electrolytic solution of known composition, the electrical potential or potential difference between the solution and the metallic conductor being a known, predetermined quantity. When such a reference electrode is combined in closed circuirty with a second electrode of suitable type, immersed in an electrolytic solution of unknown properties, and the total electrical potential across the circuit is measured, the potential difference between the second electrode and solution of unknown properties can be determined. This determination may represent different properties of the unknown solution, depending upon the type of second electrode immersed in the solution. For example, if a silver-silver sulfide electrode were utilized, the potential difference would be indicative of the sulfide concentration in the solution. Other type electrodes can be utilized to determine the proportion of oxidized to reduced ions present in a solution (e.g. the proportion of ferrous to ferric ion present in a solution).

A glass electrode is conventionally composed of a glass bulb filled with a buffered solution of known pH into which extends a metallic wire such as a silver wire coated with silver chloride. When an electric current is caused to pass through the buffered solution and the solution of unknown properties into which the bulb is immersed, the potential measurement across the glass membrane of the bulb is indicative of the hydrogen ion concentration of the solution of unknown properties. Therefore, the combination of a reference electrode and glass electrode serves as a pH determination unit.

A reservoir containing a metallic inner electrode immersed in a solution of known composition is a basic structure common to both glass and reference electrodes. Determination of the properties of some solutions may involve immersing these electrodes and their integral reservoirs in solutions under high pressure. For example, it has become desirable to determine, in situ, the pH of water at pressures substantially greater than 50 p.s.i.a. conventional reservoir-type reference and glass electrodes would be destroyed or damaged under such pressures.

An object of this invention is to provide electrodes capable of operating under pressures up to 400 p.s.i.a. or greater.

A further object of this invention is to provide a reference electrode that will operate under high pressures for extended periods of time without the use of external devices. All reference electrodes, in order to be operational, must be capable of continuously discharging, at a substantially constant rate, minute quantities of the enclosed electrolyte from its reservoir to the surrounding solution of unknown properties, in order to maintain a closed electrically-conducting circuit across the cell. Discharging electrolyte acts as an electrical bridge. In order to prevent contamination of the enclosed electrolyte and subsequent alteration of the known potential difference that exists between the enclosed electrolyte and metallic electrode within the reference electrode, the reference electrode must continuously discharge electrolyte from its reservoir and it must preclude flow in the opposite direction. The high-pressure reference electrode depicted by the patent to Laird et al. No. 2,930,967 does not possess this capability. The present invention involves a reference electrode that possesses the self-contained ability to discharge electrolyte under high pressure.

For a more detailed understanding of the invention and for further objects and advantages thereof, reference is to be had to the accompanying drawings, in which:

FIG. 1 shows the disassembled reference electrode of the present invention.

FIG. 2 shows the assembled reference electrode of the present invention without the electrolyte therein.

FIG. 3 shows the procedure for filling the reference electrode with electrolyte and purging the air therefrom.

Figure 4:
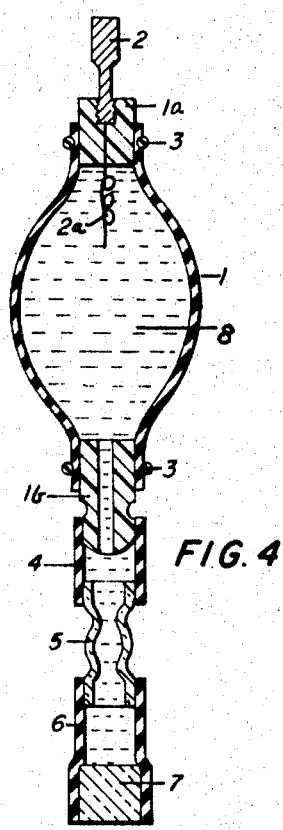
FIG. 4 shows a cross section of the filled, assembled reference electrode.

Referring to the drawings, particularly FIGS. 1 and 2, numeral 1 indicates the walls of the main body of the reference electrode electrolytic reservoir. On top of the reservoir is a head portion 1a composed of a solid, electrically nonconductive plastic material such as "Teflon," a tetrafluoroethylene polymer, through which an inner electrode, such as a silver wire 2a, has been extended and fastened. Wire 2a is soldered at the upper end thereof to an electrical jack 2 composed of, for example, an insulated brass fitting capable of withstanding high pressures. Jack 2 is capble of being connected via an insulated electrical plug and an electrical cord to one of the electrode terminals of a pH meter or other potential measuring device. The lower end of the wire is formed into a helix, and, in the case of a silver wire, is electroplated with a thin coat of silver chloride. The thin walls 1 of the reservoir could define many suitable geometrical configurations other than a tube but they must be flexible and distensible. Any flexible, distensible electrically nonconductive plastic type material, further being impermeable and chemically inert to the fluids that are to come in contact with it, may be used. Latex rubber and silicone rubber can be used when the electrolyte is a potassium chloride solution saturated with silver ions and the surrounding medium of unkown properties is water. Below the main body of the reservoir is a base portion 1b composed of an electrically nonconductive material such as "Teflon," hollow through the center thereof to allow flow of electrolyte. Rubber compression rings 3 attach the head and base portion to the main reservoir body. Flexible, electrically nonconductive tubing 4, composed of, for example, low sulfur content rubber, connects the base to a rigid glass connector 5 flared at both ends, the connector, in turn, being attached at its lower end to another piece of flexible, electrically nonconductive tubing 6 such as low sulfur content rubber tubing. Such tubing material is essential since sulfur reacts with silver ions, a typical reference electrode solution constituent. A porous element 7 such as a porous glass rod which provides the discharge outlet for the electrolyte is contained in the lower end of tubing 6. Unfired "Vycor Brand Glass No. 7900," a high silica content glass, has been found to be adequate but other materials of similar characteristics may serve as well. Materials chemically inert toward the fluids that come into contact with the electrode during operation obviously must be used to compose the tubing and head and base portions.

The reference electrode, as shown in FIG. 3, is prepared for operation by removing the rigid connector 5 (FIG. 2) from the connector tubing 4. A flexible filling bottle 9, preferably made of polyethylene, which contains the reference electrode electrolyte, such as potassium chloride solution saturated with silver ions, is inserted into the lower end of the connector tubing 4 by way of a rigid, flared glass tip 9A and the electrode is inverted. By alternately applying and releasing hand pressure on the filling bottle, the tube body is filled to distention with electrolyte and purged of most of the air. When the desired amount of liquid has been pumped into the reservoir, the connector tubing 4 is closed with a clamp, the filling bottle is removed and the rigid connector 5 is reinserted. After removing the clamp, the electrode is ready for use as shown in FIG. 4. As can be readily seen the connecting elements 4, 5, 6 facilitate filling and handling of the electrode.

Figure 5:
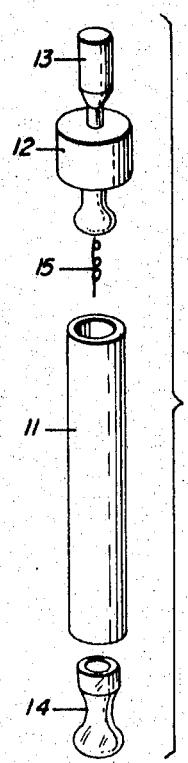
FIG. 5 shows the disassembled glass electrode of the present invention.
Figure 6:
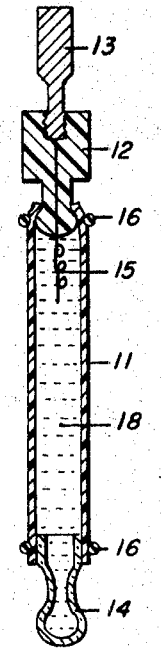
FIG. 6 shows a cross section of the assembled glass electrode of the present invention with a suitable buffer solution therein.

Referring to FIGS. 5 and 6, the glass electrode reservoir is composed of a tube with flexible walls 11. The theory of operation of the glass electrode has been fully treated by Dole, The Glass Electrode, John Wiley & Sons, New York, 1941.

Any flexible, electrically nonconductive material, imperameable to and chemically inert to the fluids that are to come into contact therewith, may be used as the wall membrane 11 of the reservoir. "Teflon," a tetrafluoroethylene polymer can be used for nearly all applications. Head portion 12 is composed of a solid, electrically nonconductive plastic material such as "Teflon," through which an electrode such as a silver wire 15 coated with silver cloride has been extended and fastened. The upper portion of this wire is suitably attached, for example, by soldering to an insulated electrical jack 13 composed of, for example, a brass fitting capable of withstanding high pressures while the lower portion of the wire is formed in a helix and immersed in the buffer solution 18. Jack 13 is capable of being connected via an insulated plug and an electric cord to an amplifier and thence to one of the terminals of a volt meter graduated, for example, to read directly in pH units. Numerals 14 indicates the conventional glass membrane tip across which the potential differences occurs. The glass of the tip is a well known special type, its composition being high in sodium and calcium content and low in aluminum and potassium; however, glasses of other compositions may work as well. MacInnes and Dole, Journal of the American Chemical Society, vol. 52, page 29, 1930, recommend a glass having the composition 72 percent $SiO_2$, 22 percent $Na_2O$, and 6 percent $CaO$. Epoxy glue and rubber compression rings 16 attach the glass tip and head portion to the main reservoir body and help to form a fluid-tight buffer solution container. As in the case of the reference electrode, all construction materials should be chemically inert to fluids in process.

Figure 7:
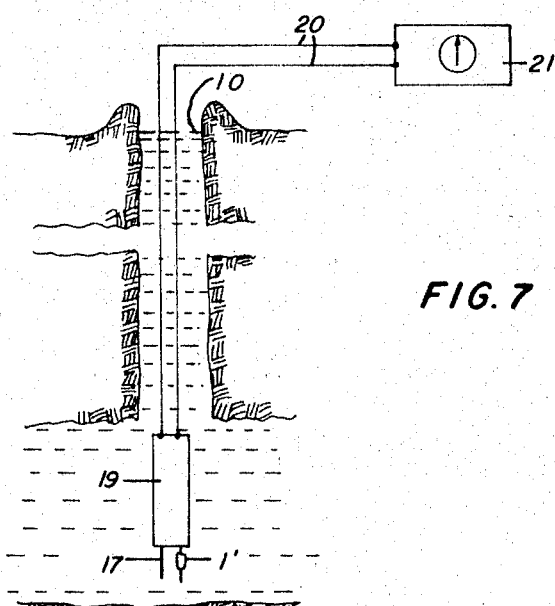
FIG. 7 shows a system embodying the glass and reference electrodes of the invention.

Flexible wall membranes 1 and 11 in the references and glass electrodes, respectively, prevent undesirable pressure differentials across the walls during operation under high pressure such as those encountered in well water 10 shown in FIG. 7, thereby preventing undesirable pressure differentials across the glass tip of the glass electrode and the glass rod of the reference electrode which would otherwise result in damage to these glass articles. Furthermore, the pressure equilibration between the inside of the glass electrode and outside environment brought about by the flexible walls also minimizes mechanical strains in the glass tip 14, which mechanical strains cause changes in the potential across the inner and outer surfaces of the glass tip. Therefore, the glass membrane in the glass electrode of the present invention is independent of the environmental pressure whereas the resultant potential of conventional glass electrodes, without the pressure equilibration feature, will be a function of environmental pressure.

Due to the pressure permitted within the reference electrode reservoir by the distensible membrane 1, the electrolyte within the reservoir is at a greater pressure than the liquid in which the reference electrode is submerged, thereby providing for continuous discharge of electrolyte. Outward flow of electrolyte is controlled by porous element 7 to a fraction of a milliliter per day. Therefore, the volume of the reservoir, which is about 70 milliliters, and the pressure within the reservoir remain essentially constant for many hours of operation even at high pressures such as are present in deep wells. Distensible walls 1 and porous element 7 together provide for continuous discharge of minute quantities of electrolyte at a substantially constant rate for extended periods of time.

In FIG. 7 the high pressure glass electrode 17 of the present invention has been combined with the high pressure reference electrode 1' of the present invention to determine the pH of well water 10 under high pressure. An amplifier 19 and insulated wires 20 attach the electrodes to a volt meter 21 above the ground, the meter is graduated to read directly in pH units.

When utilizing a rubber latex reservoir, the reference electrode of the present invention may be operated under environmental pressure as high as 400 p.s.i.a. for more than 28 hours without damage or change in calibration. As with conventional reference electrodes, this electrode can be combined with other electrodes to determine a plurality of properties of a solution.

The glass electrode of the present invention is capable of accurately measuring pH values in aqueous systems under pressures up to at least 400 p.s.i.a. It can remain operational in these high pressure systems for many days and can readily be used for quality control in many industrial processes.

While the particular electrodes herein described are well adapted to carry out the objects of the present invention, it is to be understood that various modifications and changes may be made all coming within the scope of the following claims.

What is claimed is:

1. In an apparatus for electrolytically determining properties of a fluid wherein a reference electrode is immersed in said fluid whereby said fluid surrounds said electrode, said electrode comprising a substantially closed reservoir containing electrolyte solution; an inner electrode means immersed in said solution and extending outside said reservoir; means connected to said reservoir to discharge minute quantities of said solution from said reservoir into said surrounding fluid; said reservoir including flexible, distensible, electrically nonconductive wall means which define the major portion of said reservoir, said wall means being distensible to the extent that said electrolyte solution stretches said wall means outwardly to such a degree that the pressure within said reservoir is greater than the pressure in said surrounding fluid whereby minute quantities of said electrolyte solution are continuously forced through said minute quantity discharge means; said stretching of said wall means being opposed only by said surrounding fluid.

2. The electrode of claim 1 wherein said minute quantity discharge means is connected to said reservoir by connector tube means, said connector tube means including a glass tube detachably connected at one end thereof to one end of a first rubber tubing, the other end of said first rubber tubing containing said minute quantity discharge means, a second rubber tubing detachably connected at one end thereof to the other end of said glass tube, the other end of said second rubber tubing connected to said reservoir.

3. The electrode of claim 2 wherein said wall means, when undistended define a tubular shaped reservoir.

4. The electrode of claim 3 wherein said minute quantity discharge means comprises a porous high silica glass rod.

5. The electrode of claim 1 wherein said minute quantity discharge means comprises a porous high silica glass rod.

6. In an apparatus for determining the pH of a liquid under high pressure wherein a high pressure reference electrode immersed in said liquid is connected through a pH meter to a high pressure glass electrode immersed in said liquid, said reference electrode comprising a substantially closed reservoir containing electrolyte solution, an inner electrode immersed in said electrolyte solution and extending outside said reservoir, electrical conductor means attached to said outside extension, insulated wire means connecting said conductor means to said pH meter, said reservoir including flexible, distensible, electrically nonconductive, said wall means being chemically inert and impermeable to said electrolyte solution and said surrounding liquid, said wall means defining the major portion of said reservoir, means connected to said reservoir to discharge minute quantities of electrolyte solution from said reservoir to said surrounding liquid, said wall means being distensible to the extent that said electrolyte solution stretches said wall means outwardly to such a degree that the pressure within said reservoir is greater than the pressure in said surrounding liquid whereby minute quantities of said electrolyte solution are forced through said minute quantity discharge means; said stretching of said wall means being opposed only by said surrounding liquid.

References Cited

UNITED STATES PATENTS

| | | | |
|---|---|---|---|
| 2,595,042 | 4/1952 | Wyllie | 204—195 |
| 2,684,938 | 7/1954 | Mantzell | 204—195 |
| 2,930,967 | 3/1960 | Laird et al. | 204—195 |
| 2,986,511 | 5/1961 | Digby | 204—195.1 |
| 3,208,928 | 9/1965 | Landers et al. | 204—195 |
| 3,220,937 | 11/1965 | Friese et al. | 204—1 |

JOHN H. MACK, Primary Examiner

T. TUNG, Assistant Examiner